G. W. BELDAM.
ELASTIC WHEEL TIRE.
APPLICATION FILED FEB. 27, 1912.
1,267,738.
Patented May 28, 1918.
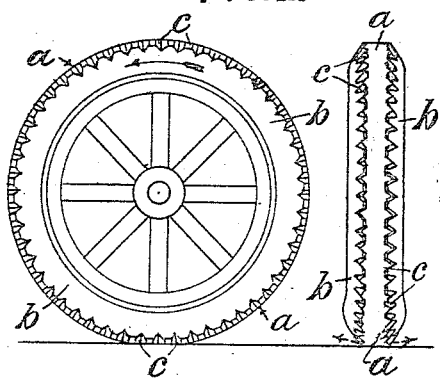
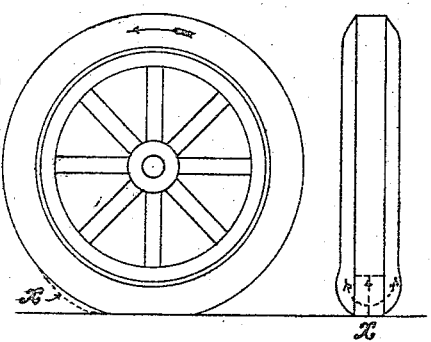
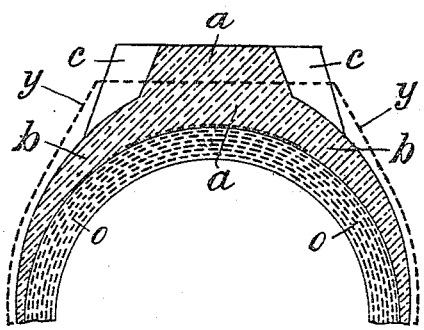
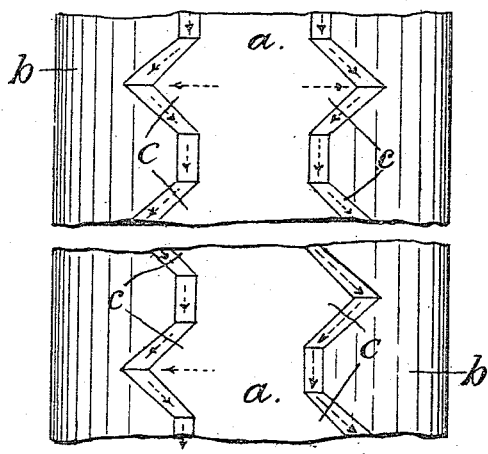
WITNESSES:
John C. Sanders
Albert F. Heuman
INVENTOR:
George William Beldam

UNITED STATES PATENT OFFICE.

GEORGE WILLIAM BELDAM, OF EALING, ENGLAND.

ELASTIC WHEEL-TIRE.

1,267,738.   Specification of Letters Patent.   Patented May 28, 1918.

Application filed February 27, 1912. Serial No. 680,201.

*To all whom it may concern:*

Be it known that I, GEORGE WILLIAM BELDAM, a subject of the King of England, residing at Ealing, in the county of Middlesex, England, have invented certain new and useful Improvements in Elastic Wheel-Tires, of which the following is a specification.

This invention has reference to elastic wheel tires, and more particularly those of the pneumatic type, used on wheels of self-propelled vehicles.

It is well recognized that it is very desirable to increase the life or duration of pneumatic tires, or covers of such tires, used on self-propelled vehicles, especially that of those which are subjected to very severe work and strains of various kinds; and many attempts have been made to accomplish this increase of life, and to do so without sacrifice of other qualities and characteristics necessary in tires of the kind; and some of these attempts have been in the direction of attaining the end referred to by increasing the thickness or quantity of rubber in the tread, a further incidental effect of which is to render the tire less liable to puncture. But these attempts have on the whole been unsatisfactory, as the use of this relatively large quantity or thickness of rubber has been the cause of, or involved, the introduction of interactions between the rubber and the canvas or like foundation or case of such a kind as to tend to the disintegration of the structure of the tire, in that, through this interaction, produced in and by the wheel running over the road (and more especially the driving wheels) the tendency of the coming apart of the rubber and the canvas foundation or base has been set up, and has, moreover, in effect resulted, especially in cases where the weights on the tires are great and power of the motor and rate of speed of traveling high; and this coming away of the rubber, moreover, has been due to the contravention of the principle that rubber is incompressible, and can only be displaced.

Further, where a large quantity of rubber is used in the tread, and from the actual tread surface the rubber is graduated off in thickness around the sides or walls of the tire foundation or base, toward the beads, the rubber portion of the tread will be such, that in actual practice, it will be found to be too heavy, and produces such a strain on the canvas foundation or shell, due to the heaping up of the rubber by being pressed forward in the action or forward rolling of the tire in running, that it will separate from the canvas.

This heaping up of the rubber in a forward-upward direction, is one of the chief causes of destructive interaction or "friction" between the rubber portion of the tread and the canvas foundation to which it adheres. This "heaping up" will hereinafter be referred to as "circumferential displacement" since it occurs in the direction of the circumference of the wheel.

Therefore, while it has been proposed to use a relatively large thickness or quantity of rubber in and near the actual tread portion of the tire, it has for reasons stated, been found disadvantageous; and if the difficulties and drawbacks referred to are to be avoided, it is not practicable to use beyond a certain thickness of rubber in the tread portion, by the methods used hitherto.

In speaking of the tread portion, it will be assumed that the tires in question, for the purposes of illustrating the characteristics of this invention, are those in which the tread part is raised more or less abruptly, and stand above the side or wall portions of the rubber at the side of the tread, and that the tread is more or less flat on its outer surface.

In a pneumatic tire, when running, a certain wave-like movement is set up on the canvas foundation or base, as well as in the rubber; and this wave like movement on the foundation does not coincide or synchronize with the wave like movement in the rubber itself, if the rubber tread is increased in thickness beyond a certain degree; and, where breakdowns in tires, of the character referred to, have taken place, these have been primarily or largely due to this fact, namely, the rubber of the tread has been of undue thickness, or has been improperly distributed, or proportioned.

Moreover, the tendency of the square tread, in this ordinary type of tire, is to wedge itself inward under the pressure of heavy loads, thus setting up a destructive action in the walls, and this tendency is increased in proportion as the tread is made deeper and narrower.

Now according to this invention, the rubber of the tire, that is, the tread and the sides, is so distributed and of such proportions at different parts, and so made or formed, that a relatively large degree of thickness of the tread portion can be safely used, without entailing or involving in the tire or cover the difficulties or deficiencies, and the disintegrating or destructive influences or effects above referred to; and without necessarily increasing the volume and weight of the rubber portion of the tire, beyond that of the ordinary rubber tire; and in this tire cover the thickness of rubber between the outside actual contact surface and the foundation, is relatively great—and it—the tread—is therefore relatively narrow.

In the drawings accompanying the specification, the improvements hereunder are illustrated; Figure 1 shows, in side elevation and end view, a common form of pneumatic wheel tire, and the direction of the displacement of the rubber in running; while Fig. 2 shows in side elevation and end view a wheel tire according to this invention, and the direction of displacement of the rubber.

Fig. 3 is a cross section to a larger scale of a tire of this invention, the dotted line representing an average tire of ordinary square tread design; Fig. 4 a plan showing the improved characteristics or features of the tire according to this invention, and Fig. 5 is a view similar to Fig. 4 but showing a modification of the tread.

In Figs. 3 and 4 of the drawings, illustrating the constructive characteristics of the tire hereunder, $a$ represents the portion of the rubber which is disposed outside the canvas or like base or foundation $o$, and forms the tread proper of the tire; and $b$ the portions of rubber which form the side walls; $c$ are interspaced portions of rubber, projecting out laterally from each side of the raised tread portion $a$ and flush with it on the surface.

As will be seen from the proportions shown more especially in Fig. 3, the rubber tread portion $a$ is relatively narrow, and the thickness, from the outside surface of the base or foundation $o$ to the actual tread surface of the portion $a$, is relatively great; the proportions shown being those which have been found to be advantageous, namely the thickness of the tread part $a$ is about twice as great as the thickest part of the wall $b$. The rubber forming the side walls $b$, and covering the canvas base or foundation $o$ at the sides, is relatively thin at the points where it joins the base of the narrow tread portion $a$; and from these points it gradually diminishes in thickness, as shown, to or toward the beads at the edges of the tire. And when this construction is compared with that of other tires, it will be seen that the mass of rubber is approximately equal in both types.

The interspaced parts $c$, which are flush with and project out from each side of the narrow tread portion $a$, which in the case shown are of V shape, extend down the rubber walls $b$, as shown in illustration into which they gradually merge. These parts $c$ are preferably opposite each other on each side of the tread; but in some cases, where desired, those on one side may be placed at points intermediate to those on the other, as shown in Fig. 5, in contradistinction to the opposed relation thereof as shown in Fig. 4, and while, preferably, they are of V form, they may be of any other suitable shape.

These parts $c$ constitute bracings or buttresses, as it were, and by breaking the lines on each side of the tread they tend to promote the wave like action by which the rubber displaces itself, and to prevent the destructive periods caused by wrong displacements; thereby obviating the destructive interaction or internal strains which cause the rubber and the canvas foundation to come away from one another.

In running, the displacements of the rubber will, in this tire, have the tendency to follow the wave like outline of the tread, as indicated by dotted arrows in Figs. 2 and 4; and when under considerable loads, in contra-distinction to the piling up and distribution of the rubber which takes place in existing tires, at the periphery, as indicated by dotted lines marked $x$ in Fig. 1, in front of the point of contact with the road; this form of tread lessens the area of the circumferential displacement, and minimizes the friction between the canvas and the rubber—and the pressure on the tread surface is distributed, constantly varying between the width across the points (the widest part of the tread), and the narrow part of the tread; and this ever varying distribution of pressure has a distinct advantage over known forms of tires. The displacement of rubber is graduated, which is advantageous; while a further advantage is that the weight is distributed, not on one place each side of the tread, as is the case with the ordinary square tread, but between the various distances between the V, or like shaped projecting or bracing portions $c$, and the narrow tread portions $a$.

The expression "the displacement of rubber is graduated" used above, means that instead of there being one heaped up portion of rubber in front of the tire, (as is the case of the ordinary rubber tires), the displacement of the rubber in this case is broken up into so many smaller displacements at regular intervals; the comparative flexibility of the side of the tread, formed by the V shaped pieces of rubber, causing the displacement to take place between and along the V's—and at regular intervals.

The dotted arrows in Fig. 4 help to show the manner in which the displacement of rubber in this improved tire tread takes place, and how upward displacement is minimized, and lateral displacement helped; the effect being, not that illustrated in Fig. 1, where the portion of the tread or rubber coming on to the road is heaped up as shown, and the portion which actually is bearing on the road is flat for a very considerable portion of the perimeter of the tire, but, instead, the extension of the rubber is mainly laterally, as indicated by the arrows in the end view in Fig. 2, while the amount of flat portion of the tire tread which is bearing on the road is very considerably less, as indicated in the side view in Fig. 2.

The effect of this invention is the production of a rubber tire, having the special characteristics as regards the proportions of the different parts of the rubber portion, which shall conform to the principle that rubber is incompressible, and can only be displaced.

By this improved construction or form of tire, I can produce tires having treads of relatively approximately double the thickness of those which are now in general use, keeping a continuous unbroken level tread surface to the road; whereas in those tires now in use, having continuous outstanding tread surfaces, it is a well-known fact that they develop defects on the sides of the treads which cause slitting, cracking and bursting of the canvas walls which by this invention is avoided.

In the tread shown in Fig. 3 the actual width of the tread is little more than half the width of an ordinary square treaded tire, while the walls $b$ are also decreased; and this quantity of rubber is utilized in making the depth or thickness of the tread greater, and by introducing it into the V or like shaped lateral extensions $c$; the depth being say, about half as deep again as the ordinary tread referred to, the limit of possible thickness in which is reached in existing tires of the kind referred to.

In Fig. 3 the dotted line marked $y$ shows the form and proportion of parts of the ordinary square treaded type of tire.

As stated, by the proportions according to this invention, the upward tendency of the rubber during displacement, is diminished, and the rubber is caused to displace itself sidewise or laterally, as indicated by the dotted arrows in Fig. 2 instead of circumferentially as in Fig. 1. Moreover in the type of tire shown in Fig. 1, as the sides of the tread are comparatively rigid, and the tread wide, the tendency of the rubber in displacement must be circumferentially, resulting in undue friction; whereas in the improved tire shown in Figs. 3 and 4, the tread $a$ is narrow, and the sides of it are comparatively flexible, and the rubber is led to displace itself along the V's $c$, and between them in a lateral direction as shown by the arrows, Fig. 4. If there is any tendency for the rubber to be heaped up in the improved tire, it is broken up into small sections, instead of one large portion; but it is also greatly diminished and localized by its tendency to displace itself sidewise or laterally, instead of circumferentially.

What is claimed is:—

1. A wheel tire comprising a laminated non-elastic inner wall and a one-piece elastic outer wall formed with a narrow uninterrupted tread flanked on each side by V-shaped incut outwardly beveled bracings the outer surfaces of which lie flush with the face of the tread and constitute inward projecting non-skidding members.

2. A wheel tire comprising a laminated non-elastic inner wall and a one-piece elastic outer wall formed with a narrow uninterrupted tread having oppositely inclined sides flanked laterally by V-shaped incut outwardly beveled bracings the outer surfaces of which lie flush with the face of the tread and constitute inward projecting non-skidding members.

3. A tire, embodying a yieldable tread portion, comprising a medial rib and lateral interspaced V-shaped projections, the ends of such V-shaped projections being flush with the tread, and their outer edges terminating some distance from the sides of the tire.

4. A tire, embodying the usual fabric foundation and a covering of rubber, the latter embodying side portions gradually decreasing in thickness from the center toward the edges of the tire, and a medial thickened portion comprising a rib and lateral interspaced V-shaped projections, the ends of the V-shaped projections being flush with the tread of the rib, and their outer edges terminating some distance from the sides of the tire, the thickness of said medial portion, including the rib and the V-shaped projections, being approximately double the thickness of the adjacent side portions of the covering of rubber.

In testimony whereof I have signed my name to this specification in the presence of two subscribing witnesses.

GEORGE WILLIAM BELDAM.

Witnesses:
 CHAS. J. FALCONER,
 JOHN GUTHRE.

Copies of this patent may be obtained for five cents each, by addressing the "Commissioner of Patents, Washington, D. C."